March 7, 1967    N. GOLD ETAL    3,307,464
PHOTOGRAPHIC APPARATUS
Filed June 3, 1964    8 Sheets-Sheet 1

INVENTORS
Nicholas Gold
and
BY Arthur J. Sable
Brown and Mikulka
and
Robert E. Cobb
ATTORNEYS INVENTORS
Nicholas Gold
and
Arthur J. Sable
BY Brown and Mikulka
and
Robert E. Corb
ATTORNEYS

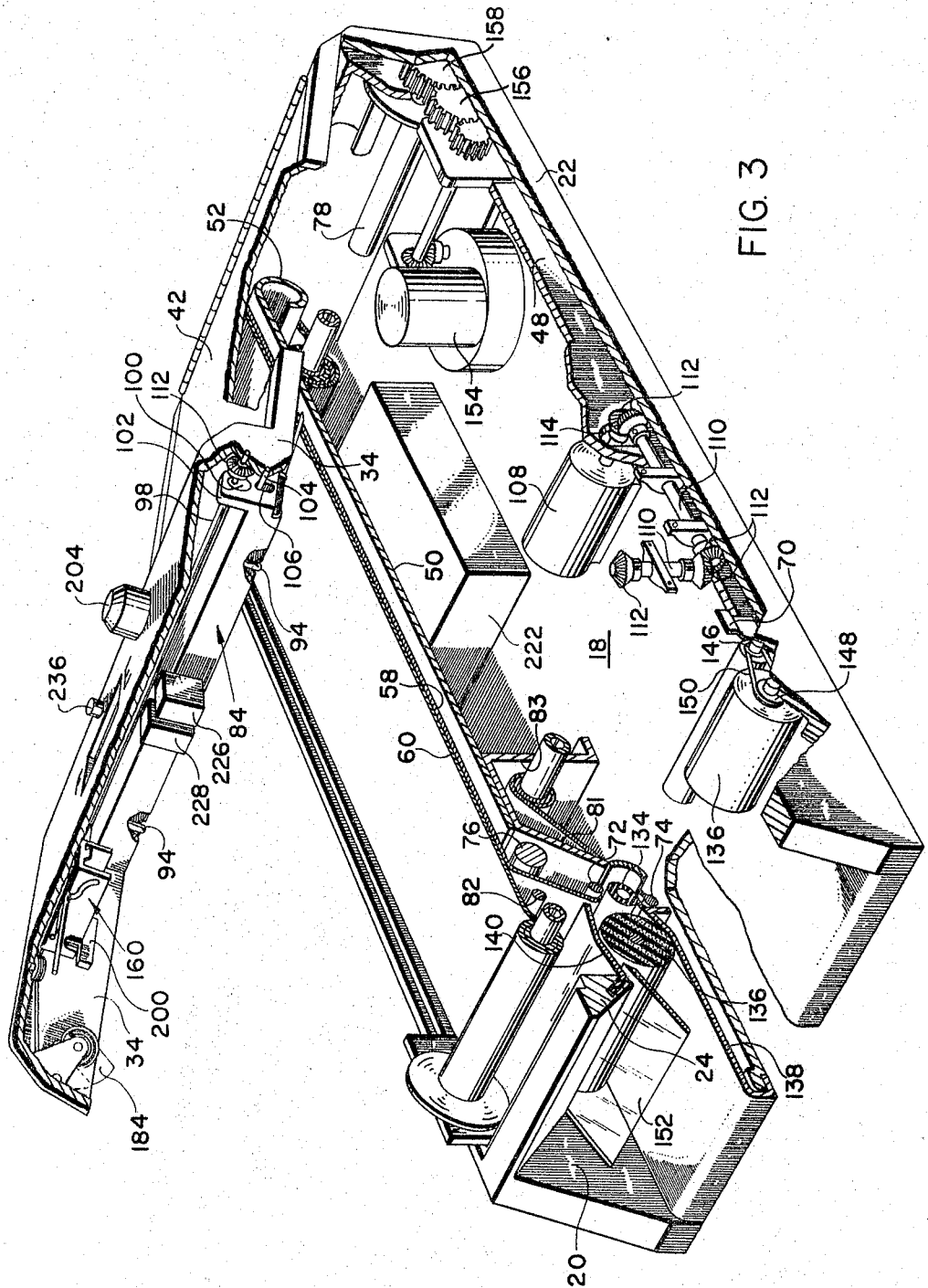

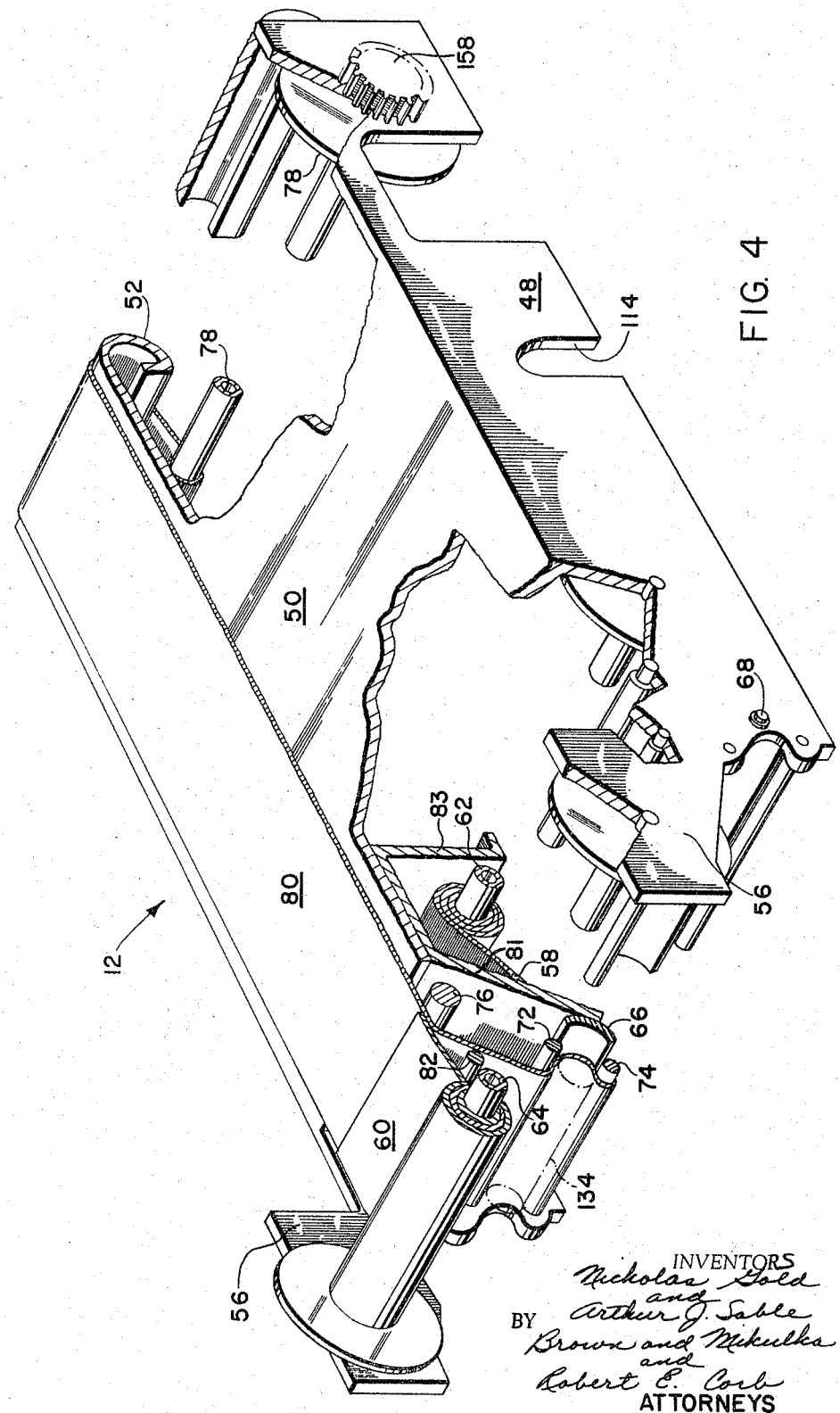

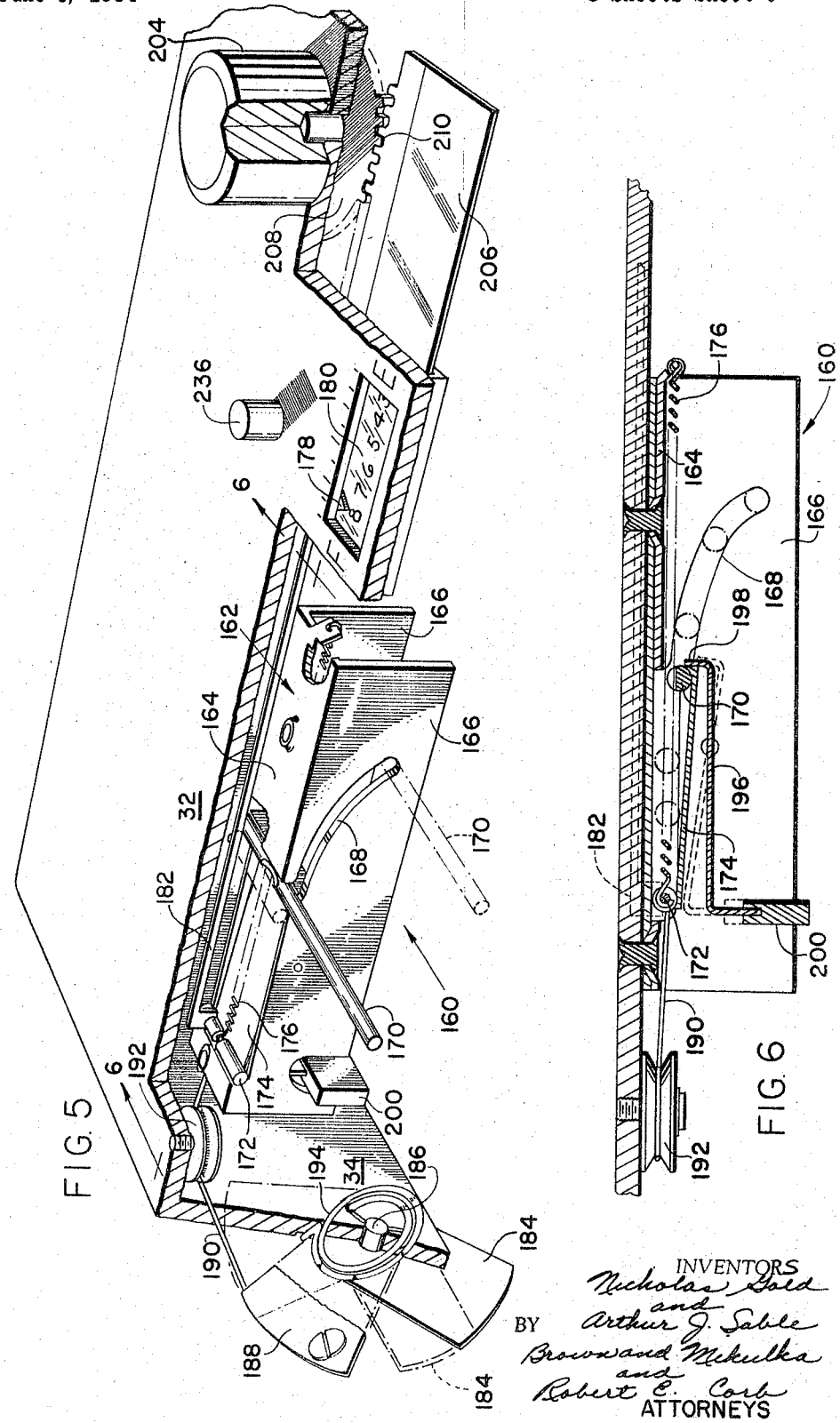

March 7, 1967 N. GOLD ETAL 3,307,464

PHOTOGRAPHIC APPARATUS

Filed June 3, 1964 8 Sheets-Sheet 8

INVENTORS
Nicholas Gold
and
BY Arthur J. Sable
Brown and Mikulka
and
Robert E. Corb
ATTORNEYS United States Patent Office 3,307,464
Patented Mar. 7, 1967

3,307,464
PHOTOGRAPHIC APPARATUS
Nicholas Gold, Arlington, Mass., and Arthur J. Sable, Saratoga, Calif., assignors to Polaroid Corporation, Cambridge, Mass., a corporation of Delaware
Filed June 3, 1964, Ser. No. 372,146
19 Claims. (Cl. 95—75)

This invention relates to photographic apparatus and particularly to apparatus for photographically copying documents.

Photographic document-copying apparatus has been proposed including means for superposing successive areas of a photosensitive image-recording sheet with original documents and moving each document and superposed area past a light source to expose the image-recording sheet and thereafter superposing each successive exposed area of the image-recording sheet with a second or image-receiving sheet and distributing a processing liquid between the sheets to form a sandwich in which a positive transfer print is formed on the image-receiving sheet. The section of the image-receiving sheet containing the positive transfer print (copy) is then separated from the image-recording sheet and remaining portions of the image-receiving sheet intermediate successive prints.

In the document-copying apparatus of the invention the sheets are moved through the apparatus during exposure and processing by coiling the processed image-recording sheet and intermediate portions of the image-receiving sheet on a take-up spool so that the exposure given each successive area of the image-recording sheet is a function of the luminance reaching the image-recording sheet from the light source, e.g. brightness of the light source, and the speed of movement of the image-recording sheet and original relative to the light source during exposure. For a number of reasons, particularly economic, it is considered desirable to employ a constant speed drive (motor) for the take-up spool; however, as the diameter of the coil of sheet material on the take-up spool increases with successive exposures the speed of movement of the image-recording sheet relative to the light source also increases tending to reduce the exposure given succeeding copies.

An object of the present invention is to provide in document copying apparatus of the type described including a take-up spool and a constant speed drive for rotating said take-up spool to move a photosensitive image-recording sheet relative to a light source to expose the image-recording sheet, sensing means for determining the diameter of the coil of image-recording sheet on the take-up spool and means for varying the quantity of light transmitted from the light source to the image-recording sheet in accordance with the diameter of the coil to maintain constant with the exposure given successive areas of the image-recording sheet.

Another object of the invention is to provide apparatus of the type described including means for holding coils of the image-recording and image-receiving sheets and wherein the sensing means include means for engaging and determining the diameter of one of the three coils.

A further object of the invention is to provide apparatus of the type described including manually operable means for varying the quantity of light transmitted from the light source to the image-recording sheet in order to produce a predetermined exposure and means for coupling the sensing means with the last-mentioned means to automatically subject successive areas of the image-recording sheet to the predetermined exposure selected.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a fragmentary perspective view of the apparatus shown with parts broken away;

FIG. 4 is a fragmentary perspective view of the expendable assemblage;

FIG. 5 is a fragmentary perspective view of a portion of the nonexpendable assemblage;

FIG. 6 is a sectional view taken substantially along the line 6—6 of FIG. 5;

Figure 1:
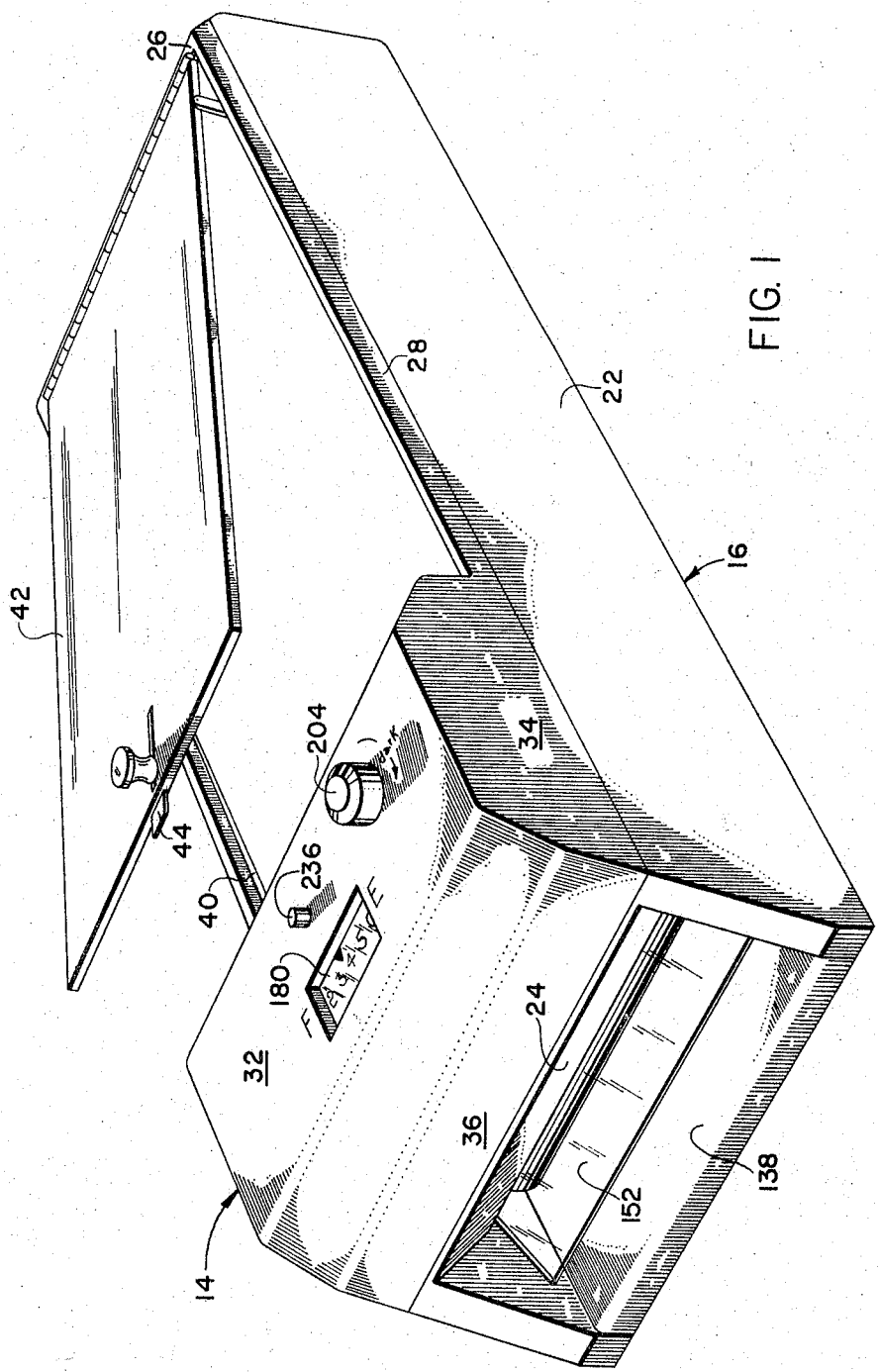
FIGURE 1 is a perspective view of document-copying apparatus embodying the invention.
Figure 2:
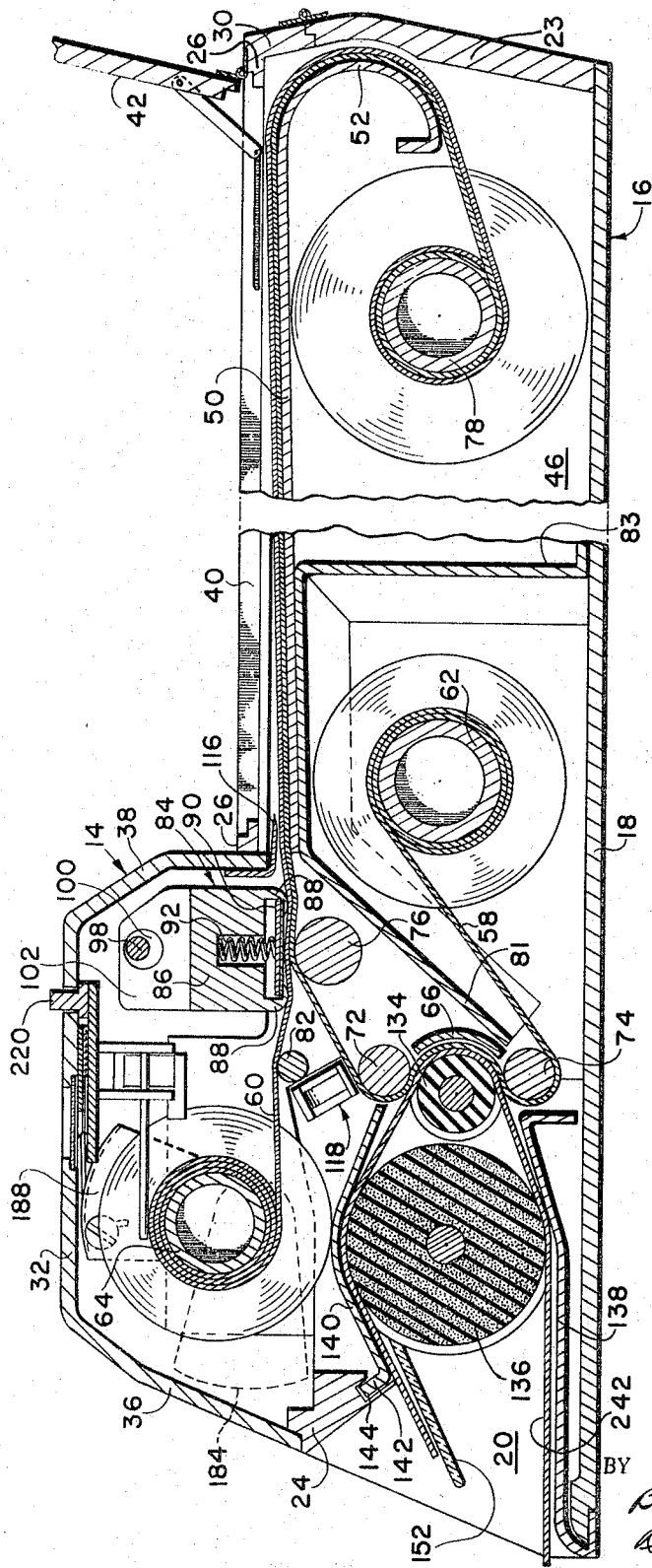
FIG. 2 is an elevational sectional view of the apparatus, the section being taken substantially midway between the sides.

The present invention is embodied in document-copying apparatus comprising a permanent or nonexpendable photographic assemblage shown in FIGS. 1 through 3, and an expendable photographic assemblage, designated 12, shown in FIGS. 1 through 4. The permanent assemblage includes a housing and the more expensive components of the apparatus while the expendable assemblage comprises the photographic materials expended in making documents and some of the less expensive components of the apparatus and is designed to be introduced into and assembled with the permanent assemblage to form a complete, operable document-copying apparatus.

The permanent assemblage comprises a housing including an upper section 14 and a lower section 16 pivoted with respect to one another between the closed or operative position shown in FIGS. 1 and 2 and the open position shown in FIG. 3, to permit loading of the expendable assemblage into the housing. The lower housing section includes a lower wall 18 with upstanding side walls 20 and 22 and an end wall 23, the opposite ends of the side walls being joined by a transverse member 24 cooperating with the side and lower walls to form an opening through which originals may be introduced into and withdrawn from the apparatus. The upper section of the housing includes an upper wall 26, relatively short dependent side walls 28 and a short dependent end wall 30 pivotally secured to end wall 23. The end and side walls of the upper and lower housing sections are provided with shoulders which mate to form a light-tight juncture when the housing sections are in closed position. Upper housing section 14 includes an enlarged end portion extending above upper wall 26 and including an upper wall 32, side walls 34 and end walls 36 and 38 cooperating to provide a chamber extending above the lower housing section. Upper wall 26 is provided with a rectangular opening 40 through which copies of documents may be withdrawn from the apparatus and a door 42 is pivotally mounted on upper wall 26 for closing opening 40 and providing access through the opening to the interior of the housing. A latching device 44 is provided for retaining door 42 in a closed position while another latching device (not shown) is provided for retaining upper housing section 14 in the closed position shown in FIG. 2.

The expendable assemblage comprises a support or chassis including a pair of side members 46 and 48 joined to one another by a transverse member 50 in the form of a generally flat plate having a width at least equal to the width of the sheet materials employed in the apparatus and a length approximately equal to the maximum length of the copies to be produced. Transverse member 50 and side members 46 and 48 may be formed of a single sheet of material such as metal and one end section 52 of transverse member 50 is curved downwardly and back upon itself to form a guide for sheet materials in a manner to be described. Expendable assemblage 12 is designed to fit within the housing of assemblage 10 with side members 46 and 48 disposed adjacent side walls 20 and 22, end sections 52 located adjacent wall 23, and transverse member 50 disposed adjacent upper wall 26 underlying opening 40. Transverse member 50 cooperates with the housing of the permanent assemblage to divide the housing into an upper or processing chamber between transverse member 50 and upper wall 26 and door 42 and a lower chamber underlying transverse member 50 between the latter and lower wall 18. Side members 46 and 48 include extensions 56 extending above and beyond the end edge of transverse member 50 furthest from end section 52 and located within the portion of upper housing section 14 comprising upper wall 32, side walls 34, and end walls 36 and 38.

The expendable assemblage includes supplies of a photosensitive image-recording sheet 58, a second or image-receiving sheet 60, and means for holding the supplies of the sheets. The image-recording sheet is coiled on a conventional spool 62 pivotally mounted at its ends on side members 46 and 48 underlying the end portion of transverse member 50 furthest from end section 52 thereof. Image-receiving sheet 60 is supplied on a spool 64 pivotally mounted at its ends between extensions 56 of side members 46 and 48.

The expendable assemblage also includes a source of illumination for exposing the image-recording sheet, guide members for guiding the image-recording sheet past the source of illumination during exposure, one of a pair of pressure-applying members for superposing the sheets and distributing a processing liquid therebetween and a take-up member for coiling the two sheets following processing thereof to advance the sheets through the apparatus. The light source, in the form shown, comprises an elongated electroluminescent panel 66 having a generally cylindrical (partial) cross-section and mounted at its ends on side members 46 and 48 near the ends thereof furthest from end section 52 of transverse member 50. Electroluminescent panel 66 is of a conventional type comprising, for example, a supporting metal electrode, a layer of electroluminescent material and a light-transmitting electrode and is electrically coupled to a source of power through contacts in the form of buttons 68 mounted on side members 46 and 48 in position to be engaged by spring contacts 70 mounted on side walls 20 of lower housing section 16. Panel 66 is mounted on side members 46 and 48 with the concave (cylindrical) side of the panel facing away from spool 62 of image-recording sheet 58.

Means are provided for guiding sheet 58 from spool 62 past panel 66 and in the form shown comprise a pair of guide rolls 72 and 74 pivotally mounted, respectively, above and below panel 66 on side members 46 and 48. Rolls 72 and 74 are positioned so that the portions of their peripheries would be almost tangent with the concave surface of panel 66 if the concave surface were extended upwardly and downwardly beyond its existing limits. The exposed image-recording sheet is superposed with the second sheet and a processing liquid is distributed between the sheets by advancing the sheets into superposition between a pair of pressure-applying members. One of these members in the form of a pressure roll 76 is mounted for rotation at its ends on side members 46 and 48 between guide rolls 72 and the end of transverse member 50 furthest from end section 52 thereof. Image-recording sheet 58 extends from spool 62 around guide roll 74 past panel 66 to guide roll 72 and thence into superposition with second sheet 60 in the vicinity of pressure roll 76 with a section of sheet 58 being supported between rolls 72 and 74 in juxtaposition with the concave side of panel 66.

As previously indicated, the expendable assemblage includes a take-up member for advancing the photosensitive and image-receiving sheets through the apparatus. This take-up member comprises a spool 78 mounted for rotation at its ends on side members 46 and 48 adjacent end section 52. The expendable assemblage is supplied with the image-recording and second sheets, or at least leaders attached thereto, coupled to one another near pressure roll 76 and to a leader 80 which extends across transverse member 50 around end section 52 to spool 78 to which leader 80 is attached. A guide roll 82 is provided supported on extensions 56 of side members 46 and 48 between spool 64 and pressure roll 76 for guiding image-receiving sheet 60 from spool 64 to pressure roll 76. The leading end portion of image-recording sheet 58 including at least the outermost convolution thereof on spool 62 preferably comprises a light impermeable material for preventing exposure of the remainder of the image-recording sheet by ambient light prior to loading of the expendable assemblage into the non-expendable assemblage. The expendable assemblage includes means for preventing exposure of the image-recording sheet coiled on spool 62 by light from electroluminescent panel 66 and/or by light admitted to the housing through opening 40. In the form shown, these means comprise a pair of panels 81 and 83 dependent from transverse member 50 located on opposite sides of spool 62 and secured at their ends to side members 46 and 48. Panel 83 extends downwardly to lower wall 18 and functions to separate the section of the housing underlying transverse member 50 into two chambers; one contains spool 62 and the other contains take-up spool 78. Panel 81 extends from transverse member 50 downwardly at an angle to a point closely adjacent guide roll 74 and effectively cooperates to separate the end portion of the housing from the chamber containing spool 62.

Image-recording sheet 58 comprises a photosensitive material such as a gelatino silver halide emulsion carried on a support sheet such as paper and has a width at least equal to the widest original which the apparatus is designed to copy, e.g. 8½ inches. The second or image-receiving sheet 60 is the same width and comprises a support such as paper for a positive transfer image formed, for example, by silver halide diffusion-transfer reversal. The process performed by the apparatus is a substantially "dry" process in that the liquid is confined by the sheets and does not contact any of the components of the apparatus. The processing liquid is preferably quite viscous and it is distributed between and in contact with a superposed area of the image-recording sheet and a corresponding area of the second sheet superposed therewith by advancement of the two sheets in superposition between a pair of juxtaposed pressure-applying members. The processing liquid for each exposed area of the photosensitive sheet is initially supplied in a tubular straw-shaped container of the type shown and described in U.S. Patent No. 3,047,387, issued July 31, 1962 in the name of Edwin H. Land, and is dispensed from the container onto the image-recording sheet as an elongated mass extending across the sheet adjacent the leading edges of the exposed area. The image-recording sheet including the mass of liquid is then advanced into superposition with the second sheet between the pressure-applying members for distributing the processing liquid in contact with the sheets toward the trailing edges of the exposed area laminating the sheets together to form a sandwich.

One of the pressure-applying members, i.e., roll 76, comprises a component of the expendable assemblage and the other pressure-applying member comprises a component of the nonexpendable assemblage. This other pressure-applying member comprises a support member 84 including an elongated base 86 having dependent lips 88 cooperating to define a channel in which is engaged a pressure plate 90. Pressure plate 90 is at least equal in length to pressure roll 76 and the width of the sheets and is formed of a relatively flexible material such as sheet metal coated on one side with a material, such as an organic plastic, having a relatively low coefficient of friction. Lips 88 turn inwardly toward one another to retain pressure plate 90 within the channel between the lips while the pressure plate is biased outwardly away from base 86 by a plurality of springs 92 engaged in recesses 93 in base 86. Support member 84 is mounted within the upper section of the housing adjacent end wall 38 with pressure plate 90 in juxtaposition with pressure roll 76, and springs 92 function to urge pressure plate 90 toward pressure roll 76 to apply compressive pressure to portions of the sheets engaged between the roll and plate. A multiplicity of uniformly spaced and substantially identical springs 92 are provided for exerting a substantially, uniformly distributed biasing force to the pressure plate throughout its length. The pressure plate is substantially more flexible and less rigid than pressure roll 76 so that the pressure plate can conform to roll 76 despite distortion thereof during fluid distributing operations, while applying a uniformly distributed force to the sheet tending to uniformly distribute the processing liquid therebetween. Pressure roll 76 is preferably cylindrical and plate 90 in its undeformed condition is substantially flat so that the plate and roll cooperate to define a convergent passage into and through which the sheets are advanced for distributing the processing liquid therebetween.

Figure 12:
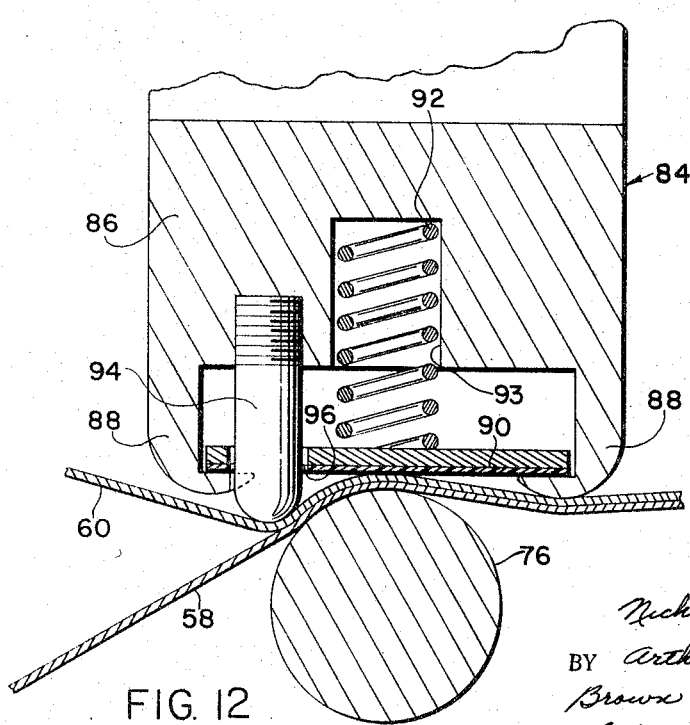
FIG. 12 is a sectional view of components of the apparatus.

Means are provided for preventing escape of the processing liquid from between the lateral edges of the sheets as the sheets are advanced through the gap between the pressure-applying members. In the form shown in detail in FIG. 12, these means comprise a pair of pins 94 mounted on base 86 near the ends of support member 84 and pressure member 90 and having end sections projecting through openings 96 in pressure plate 90 adjacent the lip 88 closest guide roll 82. The end sections of pins 94 are preferably spherical and extend into the convergent passage between pressure member 90 and pressure roll 76 in advance of the narrowest portion of the gap therebetween into position for engaging the lateral marginal portions of second sheet 60 and deforming portions of the second sheet toward the image-recording sheet. Pins 94 press the two sheets together adjacent their margins slightly in advance of the location (a line) at which pressure is exerted on the sheets by pressure roll 76 and pressure member 90 to distribute the processing liquid and thereby effectively prevent lateral spread of the liquid to and beyond the lateral edges of the sheets.

The quantity of the processing liquid supplied to the sheets for processing each exposed area of the image-recording sheet is usually such that a quantity of the liquid remains between the sheets in a mass located within the convergent passage between the pressure-applying members after the liquid has been distributed in contact with the area to be treated. The apparatus includes means for preventing this liquid from being further distributed into contact with the next successive exposed area of the image-recording sheet. These means space pressure plate 90 apart from pressure roll 76 during the terminal portion of movement of the sheets between the plate and roll in order to terminate further distribution of the liquid and collect and retain it between the sheets; and include a shaft 98 mounted for rotation at its ends on side walls 34 above base 86. A pair of eccentrics 100 are keyed to the shaft and mounted for rotation in a pair of upstanding supports 102 mounted on the ends of support member 84 so that rotation of shaft 98 is effective to move support member 84 toward and away from pressure roll 76. Support member 84 is mounted on shaft 98 and is constrained for linear movement toward and away from roll 76 by studs 104 mounted on side walls 34 and engaged in channels 106 in the ends of base 86. Shaft 98 is preferably biased by a spring into the operative position shown in FIG. 2 to retain support member 84 in the operative or pressure-applying position shown in FIGS. 2, 9, and 12 and means are provided for rotating shaft 98 from the operative position to displace support member 84 and pressure plate 90 away from pressure roll 76 to an inoperative or liquid-collecting position shown in FIG. 10. In the form shown, both the resilient means and the means for rotating shaft 98 comprise a rotary solenoid 108 provided as a component of the permanent assemblage mounted on lower wall 18 between panel 83 and take-up spool 78 and coupled with shaft 98 through a suitable transmission such as shaft 110 and bevel gears 112. One of bevel gears 112 is mounted on a vertical shaft 110 extending upwardly from the lower housing section into the upper portion of the housing into position to mesh with a bevel gear 112 on shaft 98 when the upper housing section is in its closed or operative position. The transmission is designed to fit between side walls 22 and 48 and is mounted on side wall 22 with side wall 48 being provided with a notch 114 through which a component (shaft) of the transmission extends into the space between the side walls.

The image-recording and second sheets are advanced between the pressure-applying members and the sandwich thus formed is advanced into the space between upper wall 26 and door 42 and transverse member 50 by rotation of roll 78 until a portion of the sandwich including the exposed area of the image-recording sheet is located underlying opening 40. The sheets comprising the sandwich are permitted to remain in superposition for a predetermined processing period during which a positive transfer image is formed in the area of the image-receiving sheet superpositioned with the exposed area of the image-recording sheet. Door 42 is then opened and the copy comprising the aforesaid area of the image-receiving sheet is separated from the image-recording sheet. To facilitate separation of the copy, the image-recording sheet is provided with a succession of tear strips such as described in detail in the copending U.S. patent application of Donald D. Casavant et al., Serial No. 246,471 filed December 21, 1962. These tear strips are located adjacent the leading edges of each area of the image-receiving sheet in which a positive transfer image is formed and facilitate tearing of the image-receiving sheet transversely at the leading edges of the print areas. As a portion of the image-receiving sheet is being torn transversely adjacent the leading edges of a copy, the portion of the sheet is also stripped from the image-recording sheet and thereafter torn at its trailing edge against a knife 116 provided between upper wall 26 and transverse member 50 adjacent the end of opening 40 closest the pressure-applying members.

Figure 13:
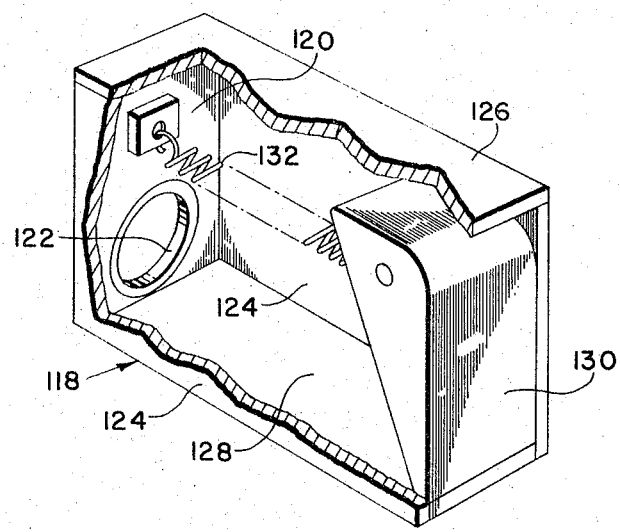
FIG. 13 is a perspective view, partially in section, showing other components of the apparatus.

As previously noted, the processing liquid for each exposed area of the image-recording sheet is supplied in an elongated tubular container very much like a drinking straw and sealed at its ends with one (trailing) end seal designed to become unsealed to provide a mouth through which the liquid is discharged in response to the progressive application of compressive pressure to the container commencing in the region of its other (leading) end. When it is desired to process an exposed area of the image-recording sheet, a container is introduced, trailing end first, into the housing through an opening in side wall 20 until the container is located adjacent and above a portion of the image-recording sheet intermediate guide roll 72 and pressure roll 76. The container is then withdrawn through the same opening across the image-recording sheet while compressive pressure is applied to the container to eject its liquid contents through a mouth at the trailing end. The apparatus includes a device designated 118 in FIG. 13 for compressing the container to eject its liquid contents and for preventing admission of light into the housing through the opening through which the container is introduced and withdrawn. Device 118 is mounted on side wall 20 and includes a frame having a base 120 at which the device is mounted on side wall 20, base 120 being provided with an opening 122 aligned with the opening (not shown) in side wall 20 through which the containers are introduced and withdrawn. Secured to and extending inwardly from base 120 are a pair of lateral walls 124 spaced from one another by a distance slightly greater than the outer diameter of a container and an upper wall 126 and lower wall 128 joined to the base and to the lateral walls to form a tube having a generally rectangular section. A pressure member 130 is pivotally mounted on and between lateral walls 124 adjacent upper wall 126 in closing relation to the tube formed by the lateral upper and lower walls. Pressure member 130 is pivotable so that the portion thereof closest lower wall 128 is movable between a position adjacent the wall inwardly to a position shown in FIG. 13 in response to engagement with a container introduced into the housing through opening 122. A spring 132 secured between base 120 and pressure member 130 is provided for urging the pressure member into the closed position shown at which light is prevented from entering the housing through opening 122. The construction of pressure member 130 is such that during withdrawal movement of the straw, the pressure member tends to pivot (in a clockwise direction), under the bias of spring 132 and as a result of frictional engagement with the straw, into the closed position engaging and compressing the straw against lower wall 128.

The permanent or nonexpendable assemblage includes means for superposing an original document with the image-recording sheet and moving the two sheets in superposition closely adjacent and relative to electroluminescent panel 66 and then separating the original from the image-recording sheet and feeding it from the apparatus. In the form shown these means comprise a support roll 134 mounted for rotation on side walls 20 and 22 with its periphery closely adjacent the concave surface of panel 66 and tangent with the surfaces of guide rolls 72 and 74 so that the image-recording sheet is engaged between support roll 134 and guide rolls 72 and 74. A portion of the image-recording sheet between the guide rolls is supported for exposure closely adjacent the concave side of panel 66. Support roll 134 is preferably formed of a material such as rubber having a relatively high coefficient of friction so that movement of the image-recording sheet in engagement with support roll 134 causes the support roll to be rotated in a counterclockwise direction.

As means for feeding original documents into the housing into superposition with the image-recording sheet between guide roll 74 and support roll 134 and from superposition with the image-recording sheet between guide roll 72 and support roll 134 and from the housing, there are provided an enlarged cylindrical feed roll 136 mounted for rotation on side walls 20 and 22 within the opening between lower wall 18 and transverse member 24 with its axis substantially parallel with the axis of support roll 134 and with its periphery closely adjacent a periphery of the support roll. Guide plates 138 and 140 mounted, respectively, below and above feed roll 136 are provided for supporting original documents against the feed roll and guiding the originals into and from the housing in response to rotation of feed roll 136. Guide plate 138 is mounted at its outer edge on lower wall 18 and extends inwardly toward the bite of guide roll 74 and support roll 134 and is biased upwardly against the feed roll. Plate 138 is formed of an opaque sheet material such as metal so that it functions to prevent admission of light into the housing beneath feed roll 136. Guide plate 140 includes an outer edge portion engaged for limited movement in a recess 144 in transverse member 24 and extends inwardly and upwardly around and in engagement with the periphery of roll 136 and thence downwardly toward the bite of guide roll 74 and support roll 134 adjacent the guide roll. The end portions of guide plate 140 are loosely engaged in recesses in side walls 20 and 22 so that the guide plate is supported by feed roll 136 and functions to prevent admission of light into the housing above the feed roll.

To make a copy of an original document, the original is introduced into the housing between feed roll 136 and guide plate 138 and the feed roll is then rotated to advance the document into superposition with the image-recording sheet between the sheet and support roll 134 at the bite of the support roll and guide roll 74. As a means for rotating feed roll 136 sheaves 146 and 148 are provided on, respectively, support roll 134 and feed roll 136 and are coupled by a conventional O ring 150 so that rotation of support roll 134 by frictional engagement with recording sheet 58 is effective to rotate feed roll 136 in the same direction to feed the leading edges of the original into engagement with and between the image-recording sheet and support roll. As the leading edge of the original emerges from between the image-recording sheet and support roll 134 at the bite of the support roll and guide roll 72, it is advanced into engagement with feed roll 136 between the feed roll and guide plate 140 and advanced by the feed roll from the apparatus. A support plate 152 is provided mounted at its ends on and between side walls 20 and 22 adjacent transverse member 24 and guide plate 140 for supporting the leading edge portion of the original as it emerges from the housing between the guide plate and feed roll to insure that the leading end of the original is not carried around the feed roll and back into the housing between the feed roll and guide plate 138.

The permanent or nonexpendable assemblage includes drive means in the form of a constant speed electric motor 154 for rotating spool 78 to advance the sheets through the apparatus. A constant speed drive motor is desirable for many reasons including its low cost combined with dependable operation. Spool 78 is driven through a transmission including a spur gear 156 located between side walls 48 and 22 and adapted to mesh with a spur gear 158 coupled with spool 78 and comprising a component of the expendable assemblage. Spool 78 is rotated to coil the processed image-recording sheet and sections of the image-receiving sheet located intermediate copies and including any liquid collected at the trailing end of each copy. Motor 154 is designed to operate at a constant speed so that the rate of advancement of the image-recording sheet past electroluminescent panel 66 during exposure to light from the panel is dependent upon the diameter of the coil on spool 78 during the exposure. This diameter, of course, increases as successive copies are made so that the rate of movement of the sheets increases with successive copies and would result in a shorter exposure for successive copies if the brightness of the light source were maintained constant. In order to provide for uniform exposure for successive copies, the apparatus includes means for varying the light from the sources allowed to expose the image-recording sheet in direct proportion to the diameter of the coil of sheet material on spool 78. Varying the light allowed to reach the image-recording sheet is preferable to varying the speed of the motor both for economic reasons and because varying the light (brightness) is the most convenient way in which to provide for a selection of predetermined exposures. Various means are provided for varying the brightness of the light source depending upon the type of light source employed. For an incandescent lamp or an electroluminescent source of the type described, means such as a variable resistor may be provided for controlling the voltage of the current to the light source. Other systems for varying the light allowed to expose the image-recording sheet include mechanical-optical means such as filters and diaphragms, and electrical means such as phase shifting circuits used with fluorescent lamps. The apparatus includes means for determining the diameter of the coil on spool 78 and operating the brightness control, e.g. variable resistor, so as to maintain constant the exposure given successive areas of the image-recording sheet. The diameter of the coil on spool 78 can be determined in a number of different ways including directly sensing the diameter of the coil on spool 78, or the diameter of the coils on spools 62 and 64 or by otherwise measuring the length of either of the sheets advanced through the apparatus. In the form of the apparatus shown, the diameter of the coil on spool 78 is determined by measuring the diameter of the coil of image-receiving sheet 60 on spool 64, since the diameters of the two coils bear a fixed inverse relation. The means for determining the diameter of the coil on spool 78 by sensing the diameter of the coil on spool 64 performs the additional function of indicating to the user of the apparatus the amount of unused materials remaining in the apparatus at any time.

The means for sensing the diameter of the coil of spool 64 comprise a device 160, shown in detail in FIGS. 5 and 6, mounted on upper wall 32 and including a channel-shaped frame 162 having a base 164 at which the frame is mounted on upper wall 32 and two dependent side walls 166 having parallel slots 168 including portions extending substantially parallel with base 164 and curved portions extending downwardly toward the lower section of the housing. The device includes means in the form of an elongated rod 170 engaged in the curved portions of the slots for engaging the coil of sheet 60 on spool 64. Rod 170 is movable downwardly (and to the right, viewing FIG. 5), in the curved portions of the slots and is coupled with a second shaft 172 by a plate 174 secured to the lower side of rod 170, shaft 172 being engaged for linear movement in the straight or horizontal portions of slots 168. Rod 170 and shaft 172 are biased by a spring 176 toward the right urging rod 170 toward the lower, right end of the curved portions of slots 168, that is, downwardly toward spool 64 into engagement with sheet 60 coiled on the spool. By virtue of this construction the location of shaft 172 is a function of the diameter of the coil of sheet 60 and to provide an indication to the operator of the amount of sheet material remaining in the apparatus, shaft 172 is coupled with an indicator 178, visible through a window 180 in upper wall 32, by a connecting rod 182 engaged in a channel-shaped recess (not shown) in the inside of wall 32.

Device 160 is constructed so that rod 170 is relatively free to move downwardly (to the right) within slots 168 toward spool 64 under the bias of spring 176 as the diameter of the coil of sheet 60 on spool 64 decreases; however, the construction is such that an upward pressure on rod 170 will tend to bend the rod rather than move it within slots 168. Thus when the materials with which the apparatus is loaded are exhausted, rod 170 will be located at the extreme lower ends of slots 168 and in this position is subject to being bent upon closure of the housing after loading of a new expendable assemblage including full coil of sheet 60 when the upper housing section is moved into its closed position. Accordingly, means are provided for returning rod 170 to an initial position shown in FIG. 5 at which the rod is engaged at the beginning, i.e., uppermost portions, of the curved portions of slots 168, and shaft 172 to its initial position at the extreme left end of the straight portions of the slots; and retaining the rod and shaft in their initial positions against the bias of spring 176 until the upper housing section is again pivoted into a closed position. These last-mentioned means comprise a lever 184 mounted on the outer end of a shaft 186 journalled in side wall 34 and extending through the side wall to the inside of the housing where the shaft is connected with a lever 188 in the form of a sector. Shaft 172 is coupled with lever 188 by a flexible connecting member such as a wire 190 extending around a spindle 192 and levers 184 and 188 are biased, in a counterclockwise direction viewing FIG. 5, by a torsion spring 194 which is stronger than spring 176 and functions to return rod 170 and shaft 172 to the initial positions shown in which lever 184 extends downwardly beyond the lower edge of side wall 34. Lever 184 is mounted in a recess in the side wall so that when the upper housing section is closed, the lever is engaged by side wall 20 of the lower housing section pivoting the lever in a clockwise direction against the bias of torsion spring 194 to the position shown in broken lines in FIG. 5, thereby leaving rod 170 and shaft 172 free to move under the bias of spring 176. In an alternative arrangement, a member may be provided on lower side wall 20 for engaging and pivoting lever 184 during closure movement of the upper housing section.

A latch is provided for retaining rod 170 and shaft 172 in their initial positions until the upper housing section has been pivoted substantially all the way into its closed or operative position whereupon the latch is released to allow rod 170 to move into engagement with the coil of second sheet 60 on spool 64. This latch comprises a latch plate 196 pivotally mounted intermediate its ends on and between side wall 166 beneath connecting plate 174. One end section, designated 198, of latch plate 196 is turned upwardly to engage rod 170 when the rod is in its initial position and the other end section of latch plate 196 is provided with a counterweight 200 for pivoting the latch plate in a counterclockwise direction viewing FIG. 6 to urge end section 198 upwardly into engagement with rod 170. Counterweight 200 is positioned so as to engage the coil of sheet 60 on spool 64 when the upper housing section is pivoted into closed position thereby pivoting latch plate 196 from engagement with rod 170 allowing the rod to move into engagement with sheet 60. When end section 198 of latch plate 196 is not engaged with rod 170, it may bear against the under side of plate 174. The brightness of the electroluminescent panel is varied by a rheostat 202 coupled with a manually engageable knob 204 mounted on upper wall 32. The knob permits the operator to vary the exposure to conform to the requirements of various original documents in order to obtain a copy of a desired character (e.g. dark or light). The rheostat may be coupled directly with connecting rod 182 so that it is varied automatically to produce uniform exposures for successive copies or, in an alternative embodiment, adjustment of the rheostat to provide for uniform exposures is a manual operation. This later embodiment is shown in FIG. 5 in which connecting rod 182 is provided with indicator 178. A plate 206 is slidably mounted on the inside of wall 32 underlying window 180 and is provided with indicia visible through the window and indicating various settings of the rheostat which is coupled to plate 206 through a gear 208 and rack 210. The rheostat is set to provide a particular exposure designated by one of the indicia by turning knob 204 to bring the particular indicia into alignment with indicator 178. In this embodiment the operator manually resets the indicia representing the desired exposure in alignment with indicator 178 for successive exposures as the indicator moves from one side of window 180 to the other as the materials embodied in the apparatus is expended and the diameter of the coil on spool 78 increases.

Figure 7:
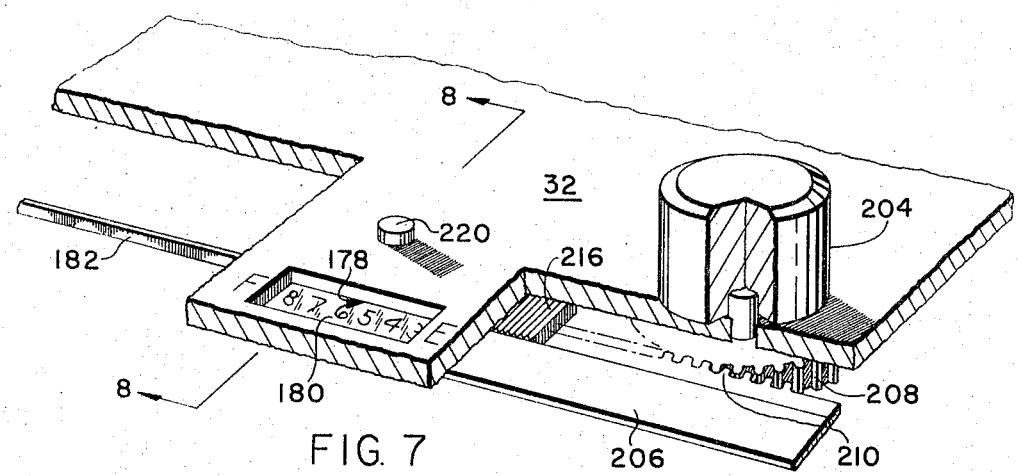
FIG. 7 is a fragmentary perspective view to FIG. 5 showing another embodiment of the invention.
Figure 8:
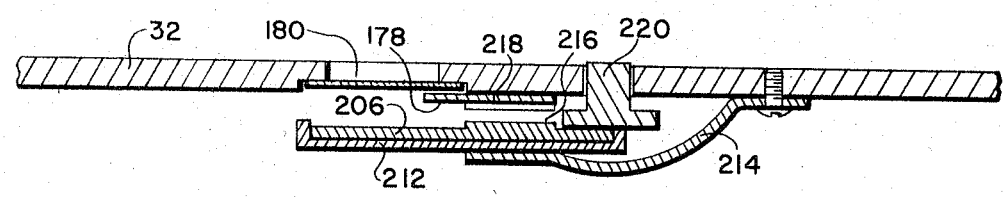
FIG. 8 is a sectional view taken substantially along the line 8—8 of FIG. 7.

Another embodiment of the control system is illustrated in FIGS. 7 and 8 in which the operator selects the desired exposure by aligning one of the indicia on plate 206 with indicator 178 and then couples plate 206 and hence the rheostat, with connecting rod 182 so that movement of the connecting rod automatically adjusts the rheostat to give the selected exposure for successive copies. In this embodiment plate 206 is mounted for limited movement toward and away from wall 32 on a support member 212. Plate 206 is provided with a serrated section 216 adapted to engage a similarly serrated member 218 coupled with or comprising a portion of indicator 178 and/or connecting rod 182. Serrations on section 216 and member 218 engage one another and retain the connecting rod at plate 206 in fixed relation. A push button 220 is provided in wall 32 for displacing plate 206 downwardly to disengage the serrations and permit the rheostat to be adjusted without moving indicia 178 to bring any one of the desired indicia into alignment with the indicator. When pressure on the button is released, the serrations then move into engagement locking the control mechanism at the particular setting so that thereafter succeeding exposures will be at that setting and will remain uniform.

Figure 11:
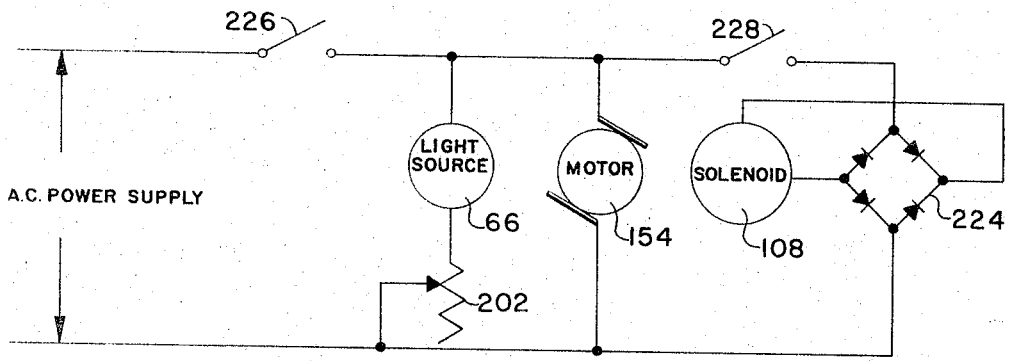
FIG. 11 is an electrical diagram showing the control and operating system of the apparatus.

The apparatus includes means for controlling the advancement of the sheets, i.e., starting and stopping the movement of the sheets, and means for energizing solenoid 108 at the proper instant in order to collect and retain any excess processing liquid. These control means, elements of which are enclosed in a housing 222 mounted on lower wall 18, include a rectifier 224 shown diagrammatically in FIG. 11 for supplying power to operate the solenoid and a pair of microswitches 226 and 228 shown in FIGS. 3, 9, and 10 mounted on support member 84. Microswitch 226 is connected in series with the alternating current power supply to control the flow of curernt to all of the electrical components of the apparatus including the light source 66, motor 154 and solenoid 108, and microswitch 228 is connected in series with rectifier 224 for controlling the operation of solenoid 108. Switch 226 is biased into an open position and includes an L-shaped actuating lever 230 including a long arm pivotally mounted intermediate its ends and a short arm extending through an opening 232 in pressure plate 90 into the convergent portion of the passage between the pressure plate and pressure roll 76 ahead of the pressure roll. The free end of the short arm of actuating lever 230 is adapted to ride on the surface of second sheet 60 and to be supported thereby retaining switch 226 closed. Sheet 60 is provided with a succession of apertures 234 each located intermediate successive image-receiving areas of the sheet and disposed so as to move into alignment with the short arm of lever 230 so that the arm is dropped through the apertures allowing switch 226 to open thereby discontinuing the flow of current to the entire apparatus and terminating a processing cycle.

At the commencement of a processing cycle, the short arm of actuating lever 230 extends into an aperture 234 and switch 226 is open so that solenoid 108 is not energized and pressure plate 90 is in its down or operative position in juxtaposition with pressure roll 76. To initiate a processing cycle, lever 230 is pivoted in a counterclockwise direction to momentarily close switch 226 energizing motor 154 to initiate the advancement of the sheets through the apparatus thereby moving aperture 234 out of alignment with the short arm of lever 230. The means for momentarily closing switch 226 include a push button 236 projecting from the housing through upper wall 32 where the push button is manually engageable and a connecting rod 238 for engaging the end of lever 230 opposite the short arm and movable to the position shown in FIG. 10 for pivoting the lever to close switch 226. As soon as aperture 234 moves out of alignment with the short arm of lever 230, the push button may be released because sheet 60 will function to support the lever in the pivoted position in which switch 226 is closed and the motor is operative.

Figure 9:
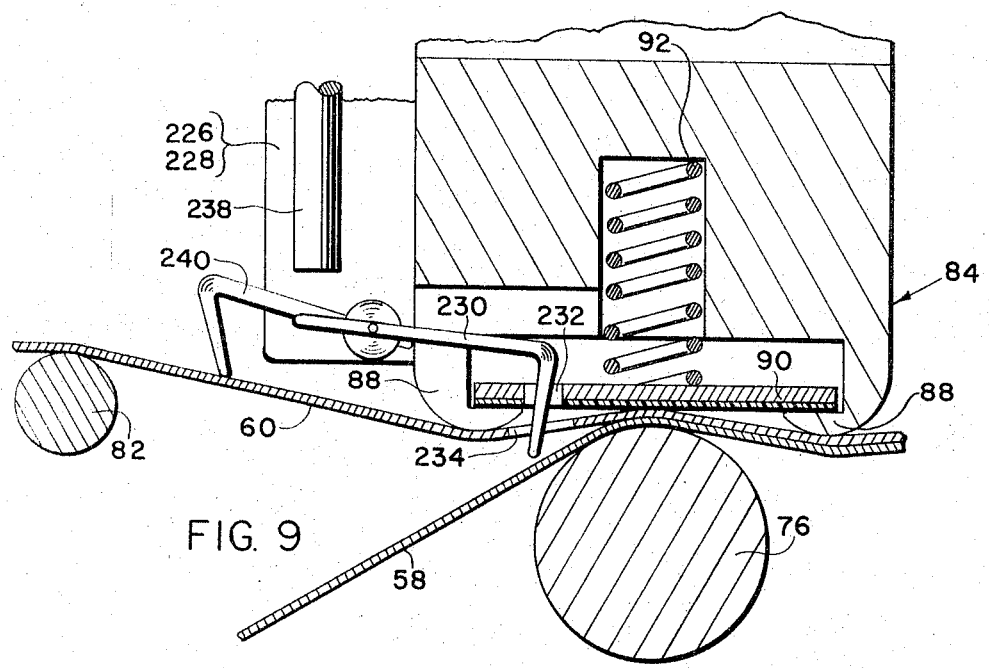
FIGS. 9 and 10 are sectional views of components of the apparatus illustrating the operation thereof.
Figure 10:
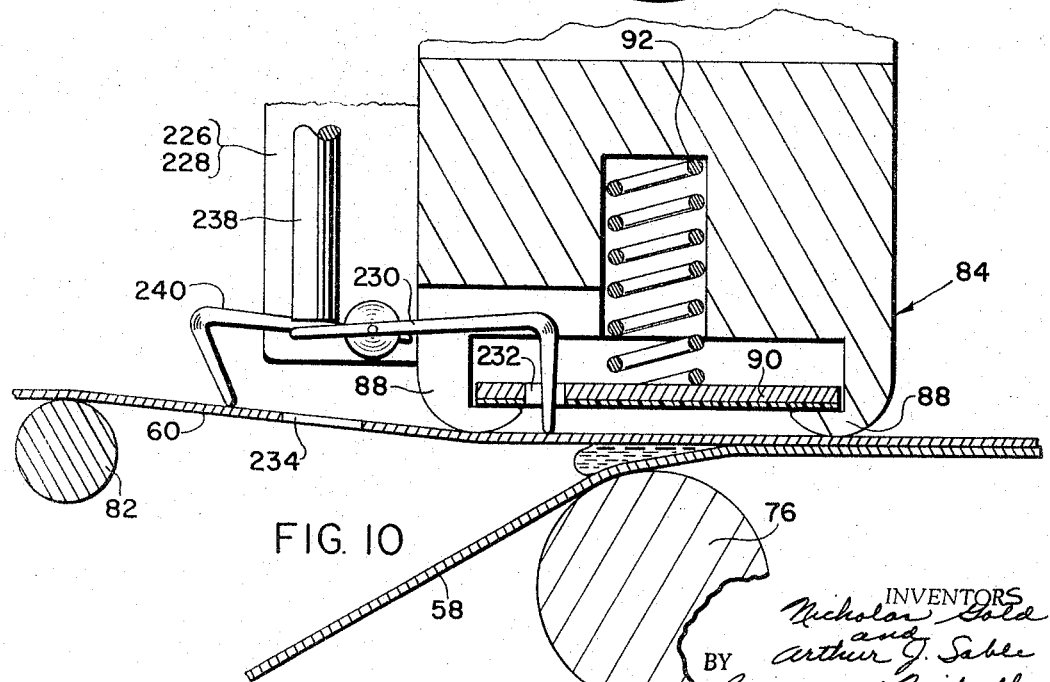

Microswitch 228 controls the operation of solenoid 108 and includes an L-shaped actuating lever 240 pivotally mounted about the same axis as lever 230 and including a short arm adapted to ride on the surface of the portion of sheet 60 intermediate guide roll 82 and one of lips 88 of support member 84. Lever 240 is biased in a counterclockwise direction and switch 228 is biased into its closed position and, as shown in FIG. 9, is retained in its opened position by engagement of sheet 60 with lever 240. Just before the end of a processing cycle an aperture 234 in sheet 60 moves into alignment with the short arm of lever 240 which enters the aperture allowing the lever to pivot in a counterclockwise direction closing switch 228 and actuating the solenoid to move support member 84 upwardly to its inoperative position (shown in FIG. 10) in order to collect and retain any processing liquid located between the sheet at the bite of roll 76 and pressure plate 90. As long as the solenoid is energized and support member 84 is in its up position, switch 228 remains closed (as shown in FIG. 10) and switch 226 is held closed by sheet 60 due to the tension thereon until the opening 234 which just actuated switch 228 moves into alignment with the short arm of actuating lever 230 allowing switch 226 to open, stopping motor 154 and deenergizing solenoid 108 so that the support member returns to its initial operative position.

In the operation of the apparatus upper housing section 14 is pivoted to an open position and an expendable assemblage 12, including sheets 58 and 60 coupled near pressure roll 76 to a leader 80 threaded across transverse member 50 and connected to spool 78, is loaded into the lower section of the housing into the position shown in FIGS. 2 and 3 and the upper section of the housing is then pivoted into closed position. When power is supplied to the apparatus, motor 154 is automatically actuated to drive spool 78 and advance the sheets through the apparatus until an opening in sheet 60 becomes aligned with the short arm of lever 230 opening switch 226 terminating the operation of motor 154. At this point the apparatus is in condition to commence an exposure and processing cycle to produce a copy of an original document. The leading edge of an original is introduced into the apparatus between giude plate 138 and feed roll 136 and before commencement of the cycle, a container of processing liquid is introduced into the housing through opening 122 of device 118 and is withdrawn in the opposite direction to deposit the fluid contents of the container onto sheet 58 adjacent guide roll 72.

Push button 236 is then depressed momentarily to close switch 226 and commence the movement of the sheets through the apparatus. The leading edge of the original, designated 242, is advanced by feed roll 136 into engagement with sheet 58 and support roll 134 and advanced together with the photosensitive sheet past electroluminescent panel 66 and into engagement with feed roll 136 between the latter and guide plate 140 and from the housing. Closing of switch 226 also energizes the electroluminescent panel, or other light source, to expose the image-recording sheet in superposition with the original. The exposed portion of the image-recording sheet is advanced into superposition with an image-receiving area of image-receiving sheet 60 between pressure roll 76 and pressure plate 90 which cooperates to distribute the processing liquid between the two sheets laminating them together to form a sandwich which is advanced into the chamber underlying door 42 between wall 26 and transverse member 50. Door 42 is then opened and the section of the image-recording sheet containing the processed copy is torn at its leading edge, separated from the image-recording sheet and then torn at its trailing edge against knife 116. During the terminal portion of movement of the sheets, processing liquid is collected between portions of the sheets intermediate the exposed and processed areas of the two sheets and the next successive areas to be exposed and processed. The apparatus then automatically shuts itself off at the end of the operating cycle in readiness for the next operating cycle.

For the first exposure, the operator selects an arbitrary exposure, for example, one in the middle of the exposure range, by setting the desired indicia in alignment with indicator 178 in window 180. After examining the copy produced by this exposure the operator may, if he wishes, reset the apparatus to produce a darker or lighter copy as desired; and depending on the form of the apparatus, that is, whether or not there is provision for coupling the sensing device with the exposure control, the apparatus or the operator maintains the indicia representing the selected exposure in alignment with the indicator so that succeeding copies are of the desired quality and character.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus including a light source for photoexposing successive portions of an image-recording sheet during movement of said sheet relative to said source and means for superposing said successive exposed portions of said image-recording sheet with a second sheet during movement of said image-recording sheet, in combination:
    a rotary member about which said image-recording sheet and at least portions of said second sheet are wrapped as a coil;
    drive means for rotating said member to move said sheets through said apparatus relative to said light source prior to passage into said coil, said drive means rotating said member at a substantially constant speed so that the speed of movement of said image-recording sheet relative to said light source during exposure is directly proportional to the diameter of said coil;
    sensing means for determining the diameter of said coil; and
    means for varying the quantity of light transmitted from said source to said image-recording sheet in accordance with the diameter of said coil to provide for substantially uniform exposure of said successive portions of said image-recording sheet.

2. The photographic apparatus of claim 1 in which means are provided for supporting a second coil of at least one of said sheets constituting a supply of said one sheet from which said one sheet is withdrawn and moved through said apparatus by said rotary member so that the diameters of said coils are related; and
    said sensing means include an engagement member biased toward one of said coils for engaging the sheet comprising said one coil to determine the diameter thereof.

3. The photographic apparatus of claim 2 comprising a housing for mounting and enclosing the components of said apparatus, said housing including two sections movable relative to one another between closed and open positions to permit loading of said apparatus;
    said one coil being mounted on one of said sections and said sensing means being mounted on the other of said sections and including means for retaining said engagement member out of position to engage said sheet comprising said one coil except when said housing sections are in said closed position.

4. The photographic apparatus of claim 1 in which means are provided for supporting a second coil of said second sheet constituting a supply of said second sheet from which said second sheet is withdrawn and moved into superposition with image-recording sheet and through said apparatus by said rotary member so that the diameters of said coils bear a predetermined relationship; and
    said sensing means include means for engaging the outer convolution of said second sheet comprising said second coil to measure the diameter of both of said coils.

5. The photographic apparatus of claim 1 in which the last-mentioned means are coupled with said sensing means for movement thereby to vary said quantity of light to provide for substantially uniform exposure of successive portions of said image-recording sheet.

6. The photographic apparatus of claim 1 in which said sensing means include a first indicator visible exteriorly of said apparatus and movable by said sensing means to indicate the length of said image-recording sheet moved through said apparatus and the last-mentioned means include a second indicator visible exteriorly of said apparatus and provided with indicia each representing a predetermined exposure, said second indicator being movable manually to bring a selected one of said indicia into juxtaposition with said first indicator and thereby set the last-mentioned means to provide for the predetermined exposure selected.

7. The photographic apparatus of claim 1 in which the last-mentioned means are operable manually for varying said quantity of light to permit selection of a predetermined exposure to which said image-recording sheet is to be subjected, and disengageable coupling means are provided for coupling said last-mentioned means with said sensing means for actuation by said sensing means to automatically subject said successive portions of said image-recording sheet to substantially said predetermined exposure.

8. In photographic apparatus including a light source for photoexposing successive portions of a photosensitive image-recording sheet during movement of said sheet relative to said source, in combination:
    a rotary member about which said image-recording sheet is wrapped as a coil;
    drive means for rotating said member at a substantially constant speed to move said image-recording sheet relative to and past said light source prior to passage into said coil;
    sensing means for engaging said image-recording sheet to determine the diameter of said coil; and
    means for varying the quantity of light transmitted from said source to said image-recording sheet in accordance with the diameter of said coil to provide for substantially uniform exposure of said successive portions of said image-recording sheet.

9. In photographic apparatus including a light source for photoexposing successive portions of a photosensitive image-recording sheet during movement of said sheet relative to said source, in combination:
    means for supporting a first coil of said image-recording sheet;
    a rotary member about which said image-recording sheet is wrapped as a second coil;
    drive means for rotating said member at a substantially constant speed to advance said image-recording sheet from said first coil relative to and past said light source into said second coil so that the diameters of said coils are predeterminedly related and the speed of movement of said image-recording sheet is inversely proportional to the diameter of said first coil and directly proportional to the diameter of said second coil;
    sensing means for engaging one of said coils to determine the diameter thereof; and
    means for varying the quantity of light transmitted from said source to said image-recording sheet in accordance with the diameter of said one coil to provide for substantially uniform exposure of successive portions of said image-recording sheet regardless of variations in the speed of movement of said image-recording sheet relative to said light source.

10. The photograhpic apparatus of claim 9 in which said sensing means include a first indicator visible exteriorly of said apparatus and movable by said sensing means to indicate the length of said sheet remaining in said second coil; and the last-mentioned means include a second indicator visible exteriorly of said apparatus and provided with indicia each representing a predetermined exposure, said second indicator being movable manually to bring a selected one of said indicia into juxtaposition with said first indicator and thereby set said last-mentioned means to provide for the predetermined exposure selected.

11. The photographic apparatus of claim 9 in which the last-mentioned means comprise means for varying the brightness of said light source in accordance with the diameter of said second coil.

12. The photographic apparatus of claim 9 in which said light source is operative to provide discrete flashes and the last-mentioned means comprise means for varying the frequency of said flashes in accordance with the diameter of said second coil.

13. The photographic apparatus of claim 9 in which the last-mentioned means include means disposed between said light source and said image-recording sheet for restricting the light reaching said sheet and means for changing the position of the last-mentioned means.

14. The photographic apparatus of claim 9 in which said sensing means include means visible exteriorly of said apparatus for indicating the length of said sheet remaining in said first coil.

15. The photographic apparatus of claim 9 in which the last-mentioned means include means operable manually for varying said quantity of light transmitted from said source to said image-recording sheet.

16. The photogrophic apparatus of claim 9 in which the last-mentioned means are coupled with said sensing means for movement thereby to vary said quantity of light to provide for substantially uniform exposure of successive portions of said image-recording sheet.

17. The photographic apparatus of claim 9 in which the last-mentioned means are operable manually for varying said quantity of light to permit selection of a predetermined exposure to which said image-recording sheet is to be subjected, and disengageable coupling means are provided for coupling said last-mentioned means with said sensing means for actuation by said sensing means to subject said successive portions of said image-recording sheet to substantially said predetermined exposure.

18. The photographic apparatus of claim 17 in which said sensing means include an indicator visible exteriorly of said apparatus and movable to indicate the length of said sheet remaining in said first coil, and said last-mentioned means include reference indicia visible exteriorly of said apparatus and each representing a predetermined exposure, said indicia being selectively movable into juxtaposition with said indicator by manual movement of said last-mentioned means to provide for selection of said predetermined exposure for which said apparatus is set.

19. The photographic apparatus of claim 9 in which said drive means include a constant speed motor.

No references cited.

JOHN M. HORAN, *Primary Examiner.*